(12) United States Patent
Ryley et al.

(10) Patent No.: US 7,738,917 B2
(45) Date of Patent: *Jun. 15, 2010

(54) INTERCOM/WIRELESS DOOR BELL FOR MULTI-HANDSET TELEPHONE SYSTEM

(75) Inventors: Gordon Ryley, Calgary (CA); Ralph Tischler, Richmond (CA); Allan Chi-Yun Wong, Hong Kong (HK); Jagjit Grewal, Surrey (CA); Stephen G. Kropp, Surrey (CA)

(73) Assignee: VTech Telecommunications Limited, Tai Po, New Territory (HK)

( * ) Notice: Subject to any disclaimer, the term of this patent is extended or adjusted under 35 U.S.C. 154(b) by 1072 days.

This patent is subject to a terminal disclaimer.

(21) Appl. No.: 11/430,048

(22) Filed: May 9, 2006

(65) Prior Publication Data

US 2007/0042804 A1 Feb. 22, 2007

Related U.S. Application Data

(63) Continuation-in-part of application No. 10/401,539, filed on Mar. 31, 2003, now Pat. No. 7,062,291.

(60) Provisional application No. 60/754,623, filed on Dec. 30, 2005.

(51) Int. Cl.
*H04M 1/00* (2006.01)
*H04N 7/18* (2006.01)
*G08B 1/08* (2006.01)

(52) U.S. Cl. .................. 455/556.1; 455/567; 455/550.1; 455/462; 348/156; 340/539.25

(58) Field of Classification Search ................ 455/90.1, 455/462, 550.1, 556.1, 566, 567; 340/539.1, 340/539.11, 539.16, 539.25, 825.69, 286.11; 348/156
See application file for complete search history.

(56) References Cited

U.S. PATENT DOCUMENTS 4,370,675 A * 1/1983 Cohn .................... 348/156
4,523,193 A * 6/1985 Levinson et al. ....... 340/825.69

(Continued)

FOREIGN PATENT DOCUMENTS

DE 44 08 972 3/1994

(Continued)

OTHER PUBLICATIONS

German Office Action with English Translation dated Dec. 3, 2007.

*Primary Examiner*—Duc M Nguyen
(74) *Attorney, Agent, or Firm*—Paul, Hastings, Janofsky & Walker LLP (57) ABSTRACT

A multi handset telephone system with a wireless telecom/doorbell module. The telecom/doorbell module has similar electronics as a cordless handset that includes audio and RF link with a base unit. A speakerphone functionality of a wireless telecom/doorbell audio processor is used to provide an intercom audio conversation. The wireless intercom/doorbell module is battery powered that is either charged by an AC adapter or by an existing doorbell wiring. The wireless intercom/doorbell module also work in parallel with the existing bell wiring. When a page key is pressed, the module pages the telephone system and shorts the doorbell wiring to make an existing bell ring. The doorbell module is coupled with a camera.

16 Claims, 8 Drawing Sheets

U.S. PATENT DOCUMENTS

| | | | |
|---|---|---|---|
| 4,764,953 A * | 8/1988 | Chern et al. | 379/355.01 |
| 5,119,186 A * | 6/1992 | Deacon et al. | 358/524 |
| 5,428,388 A | 6/1995 | Von Bauer et al. | |
| 5,428,972 A | 7/1995 | Germain | |
| 5,802,467 A * | 9/1998 | Salazar et al. | 455/420 |
| 5,930,719 A | 7/1999 | Babitch et al. | |
| 5,982,418 A * | 11/1999 | Ely | 348/153 |
| 5,995,139 A * | 11/1999 | Lee | 348/143 |
| 6,006,088 A * | 12/1999 | Couse | 455/415 |
| 6,097,429 A * | 8/2000 | Seeley et al. | 348/154 |
| 6,185,294 B1 * | 2/2001 | Chornenky et al. | 379/350 |
| 6,192,257 B1 | 2/2001 | Ray | |
| 6,433,683 B1 | 8/2002 | Robinson | |
| 6,476,858 B1 * | 11/2002 | Ramirez Diaz et al. | 348/159 |
| 6,633,231 B1 | 10/2003 | Okamoto et al. | |
| 6,760,419 B1 * | 7/2004 | Brown et al. | 379/159 |
| 7,012,523 B2 * | 3/2006 | Stuart | 340/540 |
| 7,015,943 B2 * | 3/2006 | Chiang | 348/143 |
| 7,062,291 B2 | 6/2006 | Ryley et al. | |
| 7,339,608 B2 * | 3/2008 | Ryley et al. | 348/155 |
| 2001/0041586 A1 | 11/2001 | Irube et al. | |
| 2002/0160779 A1 | 10/2002 | Arazi et al. | |
| 2003/0092453 A1 | 5/2003 | Mills et al. | |
| 2003/0176194 A1 * | 9/2003 | Farmer et al. | 455/455 |
| 2003/0176197 A1 | 9/2003 | Chen et al. | |
| 2004/0198303 A1 * | 10/2004 | Chiang et al. | 455/344 |

FOREIGN PATENT DOCUMENTS

| | | | |
|---|---|---|---|
| DE | 4408972 | * | 4/1995 |
| DE | 196 28 764 | | 7/1996 |
| DE | 196 31 259 | | 8/1996 |
| DE | 100 39 263 | | 8/2000 |
| DE | 100 45 091 | | 9/2000 |
| DE | 200 02 331 | | 10/2000 |
| DE | 102 46 649 | | 10/2002 |
| DE | 203 11 838 | | 7/2003 |
| DE | 103 59 202 | | 12/2003 |
| ES | 2133125 | | 8/1999 |
| GB | 2 242 335 | | 9/1991 |
| GB | 2 386 296 | | 9/2003 |
| JP | 11004480 | | 1/1999 |
| JP | 2000 115386 | | 4/2000 |
| JP | 2000 165853 | | 6/2000 |
| JP | 2002 152392 | | 5/2002 |
| JP | 2002 354137 | | 12/2002 |
| WO | WO 03/096696 | | 11/2003 |
| WO | WO 2006/041215 | | 4/2006 |

* cited by examiner

INTERCOM/WIRELESS DOOR BELL FOR MULTI-HANDSET TELEPHONE SYSTEM

This application claims the benefit of U.S. Provisional Application No. 60/754,623, filed Dec. 30, 2005. This application is also a continuation-in-part application of U.S. patent application Ser. No. 10/401,539, filed Mar. 31, 2003 now U.S. Pat. No. 7,062,291. The above-referenced applications are incorporated herein by reference in their entirety.

BACKGROUND

1. Field of the Invention

The present invention is directed to a wireless system, and more particularly to a wireless doorbell/intercom that is used with a multi-handset telephone system.

2. Background of the Invention

Problem to be solved. With a perceived need for increased security and surveillance, many homeowners have installed front door video cameras and/or "nanny cams" in their homes. Examples of known video monitoring systems include:

(1) "CyberEye," which is a device that senses motion and takes a still picture. The picture is then viewed by connecting the device to an external TV monitor or VCR. This system supports only black and white pictures and uses infrared illumination;

(2) "VisionTech VT62WP" is a 2.4 GHz high power wireless video system including a camera that requires line of sight between the camera and a receiver. This system is more suitable for commercial applications and, in comparison to systems with similar functionality, is very costly; and (3) "TBO-Tech ST-103W" uses a passive motion detector that is wired to a separate 2.4 GHz wireless camera and receiver. The receiver also must be connected to an external TV or VCR to view images.

Nokia offers a product that includes a camera that can be programmed to take images automatically at a designated time interval and send the images to a mobile telephone that is multimedia message-enabled and has a color screen. Alternatively, the camera can be configured to send images to an email address from which the images can be viewed. While the Nokia system offers users the ability to remotely monitor images that a camera picks up, the camera in the Nokia system is actually a mobile telephone that sends images over a GSM wireless network. Thus, owners of the Nokia system are required to subscribe to at least one wireless service account for the camera, and if wireless telephone access is desired, a second subscription must be entered into for the user's multimedia message-enabled telephone. The prospect of having to pay for and manage separate wireless service subscriptions is undesirable for most consumers, especially those with lower incomes.

Kador Ltd. offers another in-home imaging system. This system comprises a stand alone digital camera with a built-in modem. The camera takes pictures and sends them over PSTN telephone lines to a computer selected by the user. While simpler in overall architecture compared to the Nokia system just described, the Kador system is severely limited in that the user must have access to a computer that is always connected to the PSTN.

VPON, or Video Picture On Net, is yet another remote image system. VPON is advertised as a plug-&-play remote video camera server that has a built-in mini web server that provides real time video capture and streaming over the internet, an intranet, or direct telephone connection. Like the Kador system, however, the VPON system also requires access to, at the very least, a computer.

There are also a wide variety of home monitoring systems that rely on analog video that is captured by one or more cameras and fed to a transceiver. The transceiver is connected to the PSTN. A similar transceiver is provided at another end of a PSTN connection and is connected to a video monitor, such as a television set. When a call is established between the two transceivers, analog video signals from the cameras are sent over the PSTN and can be monitored remotely.

Still other known monitoring systems are described in U.S. Pat. No. 6,476,858, "Video Monitoring and Security System," and U.S. Pat. No. 6,833,683, "Multipurpose Wireless Video Alarm Device and System."

Intercom systems have been widely used in apartment buildings and residential properties. Conventionally, the intercom systems work as a doorbell that is installed at a door and includes a keyboard and/or a button. The intercom system is typically a wired system that wire-connects with a telephone line associated with a resident. In operation, a visitor at the door keys in a number or presses the button, which consequently initiates a telephone call made to the telephone number associated with the resident. After answering the call and verifying the visitor, the resident can buzz a button to open the door.

With the development of wireless telephone systems, the intercom systems have been incorporated with camera monitoring device that is integrated with a wireless telephone system. A use of intercom/door bell with a multi-handset telephone system, however, has not been seen in the market.

BRIEF SUMMARY OF THE INVENTION

Embodiments of the present invention integrate one or more of a video camera and a doorbell module into a multi-handset wireless/cordless telephone system such that a room or area in view of a camera can be monitored using a familiar cordless telephone set. Applications of these embodiments include, for example, baby monitoring, front door monitoring, and general surveillance.

By integrating a wireless camera unit into a cordless telephony system in accordance with the present invention, it is no longer necessary to purchase separate devices that may be incompatible with each other to achieve desired video monitoring functionality. As described above, many prior art systems require that a camera be connected to an external TV monitor to view images. The present invention, in contrast, permits a user to move throughout a use area (e.g., a home) with a remote handset and still monitor the area under view by the camera.

In addition to the foregoing, embodiments of the present invention provide the possibility of using the cordless phone handset/base as an alarm for sensing motion, using the cordless handset with an integrated camera to view a remote area, and viewing an area without visible light by employing infrared sensitive cameras.

Typical wireless video systems, like those mentioned in the Background section above, transmit analog NTSC or PAL video signals using 900 MHz or 2.4 GHz frequencies. The large bandwidth required to transmit these analog video signals means that lower RF power must be used which, in turn, reduces the range of these systems to several hundred feet. The present invention, in contrast, preferably employs digital video signals that are further compressed to conserve data bandwidth. In preferred implementations, a transmitter only sends the minimum digital video information necessary to be displayed on the cordless handset display. This conservation of data bandwidth reduces the RF channel bandwidth which, in turn, allows higher available RF transmit power levels. Increased power results in increased range of the video link.

Most prior art wireless video links do not support audio and, when they do, it is only in one direction (from the camera to the receiver). Embodiments of the present invention, on the other hand, provide a two-way audio link that makes it possible to support applications such as a video doorbell and baby monitor. The user can thus carry on a conversation with the person at the camera end of the system.

Non-wireless video systems require custom installation of wiring between the transmit and receive units. This is costly and also a nuisance to a home owner. Wireless operation with embodiments of the present invention, on the other hand, provides easy to install components that require no special tools or specialized installer knowledge.

Typically, only wired systems and expensive ($500+) wireless systems allow multiple camera sources to be used. The present invention, however, allows multiple cameras (e.g., 4, 6 or even more) to be used and controlled wirelessly.

Embodiments of the present invention provide a wireless doorbell that broadcasts a radio frequency (RF) message to one or more or all handsets and a base unit of a multi handset cordless telephone system. The wireless doorbell may be incorporated as a part of the multi handset cordless telephone system. Therefore, no separate doorbell/intercom system is required.

Embodiments of the present invention is to provide a cordless telephone system. The cordless telephone system includes a base unit, at least one cordless telephone handset that wirelessly communicate with the base unit; wherein the base unit and at least one cordless telephone handset include speakerphones, and a doorbell module located within a range of receivable wireless communications of the base unit and the at least one cordless telephone handset. The doorbell module includes a page button. When the page button is pressed, the doorbell module transmits an RF message to at least one of the base unit and at least one cordless telephone handset to activate an alert sound through the speakerphones.

Preferably, the doorbell module is coupled with a camera. The camera is configured to capture an image when the page button is pressed. The doorbell module is configured to transmit the image to one or more of the base unit and the handsets.

The features and attendant advantages of the present invention will be more fully appreciated upon a reading of the following detailed description in conjunction with the accompanying drawings.

DETAILED DESCRIPTION OF THE INVENTION

Figure 1:
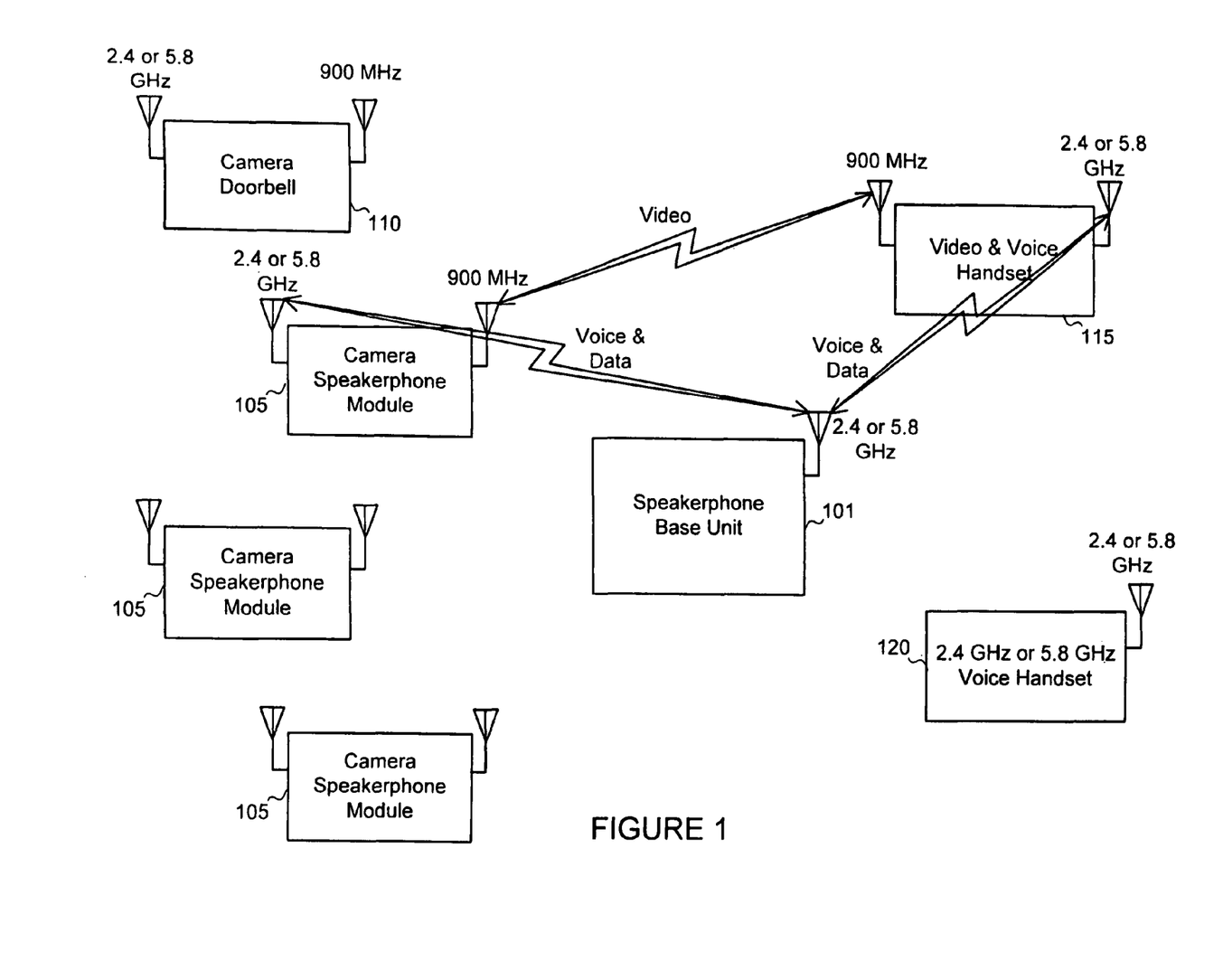
FIG. 1 depicts an exemplary system diagram for a multi handset cordless telephone system with integrated video capabilities in accordance with the present invention.

With reference to FIG. 1, the multi handset cordless telephone system of the present invention preferably includes the following components with described functionality. It should be apparent to those skilled in the art, however, that the following component listing is exemplary only and should not be considered as limiting the scope of the claims appended hereto.

Speakerphone base unit 101 preferably provides wireless voice connection to the PSTN, supports voice intercom calls and caller ID, provides answering machine functions, provides handset charging and provides data communications to handsets/cameras.

Cameral speakerphone module(s) 105 preferably create digital images, compress the digital images, as well as, wirelessly transmit the digital images. This module preferably also supports voice intercom calls using an integrated microphone and speaker, is able to answer incoming calls, provides infrared illumination and is capable of detecting motion.

Camera doorbell module 110 preferably creates digital images, compresses the digital images, and wirelessly transmits digital images. Module 110 preferably also supports voice intercom calls using an integrated microphone and speaker, includes infrared illumination capabilities and motion detection capabilities. Finally, camera doorbell module 110 preferably can cause a "door chime" to be played on remote handset upon detection of motion near a doorway (or any other space/location under view), or upon pressing a doorbell switch.

Video & voice handset 115 preferably supports incoming/outgoing voice calls using an integrated microphone and speaker associated with a telephone line or camera speakerphone module, wirelessly receives digital images, decompresses the received digital images and displays digital images on a display of the handset.

Voice handset 120 preferably supports incoming/outgoing voice calls using an integrated microphone and speaker associated with a telephone line or camera speakerphone module.

System Description:

A preferred embodiment of the present invention comprises:

One Speakerphone Base unit 101
Multiple Video & Voice Handsets 115
Multiple Voice Handsets 120
Multiple Camera Speakerphone Modules 105
Multiple Camera Doorbell Modules 110

Of course, those skilled in the art will appreciate that different numbers of the foregoing components can be arranged together without departing from the principles of the present invention.

For voice mode operations, well-known standard TDMA (either 2.4 or 5.8 GHz) cordless telephony technology is used. The base unit 101 acts as the master in the voice telephony system and the handsets/camera units 105, 110, 115, 120 are considered slaves. All voice connections are preferably made using the TDMA system including those that accompany a video link. Where a video link is in use, a voice intercom link is preferably simultaneously made using the base. The intercom link preferably also supports data signaling between the video camera and the video handset.

For video mode operations, a digital modulation 900 MHz unidirectional RF link is preferably made between the camera module 105, 110 and the video handset 115 after the initial TDMA voice/data link is established.

Figure 2:
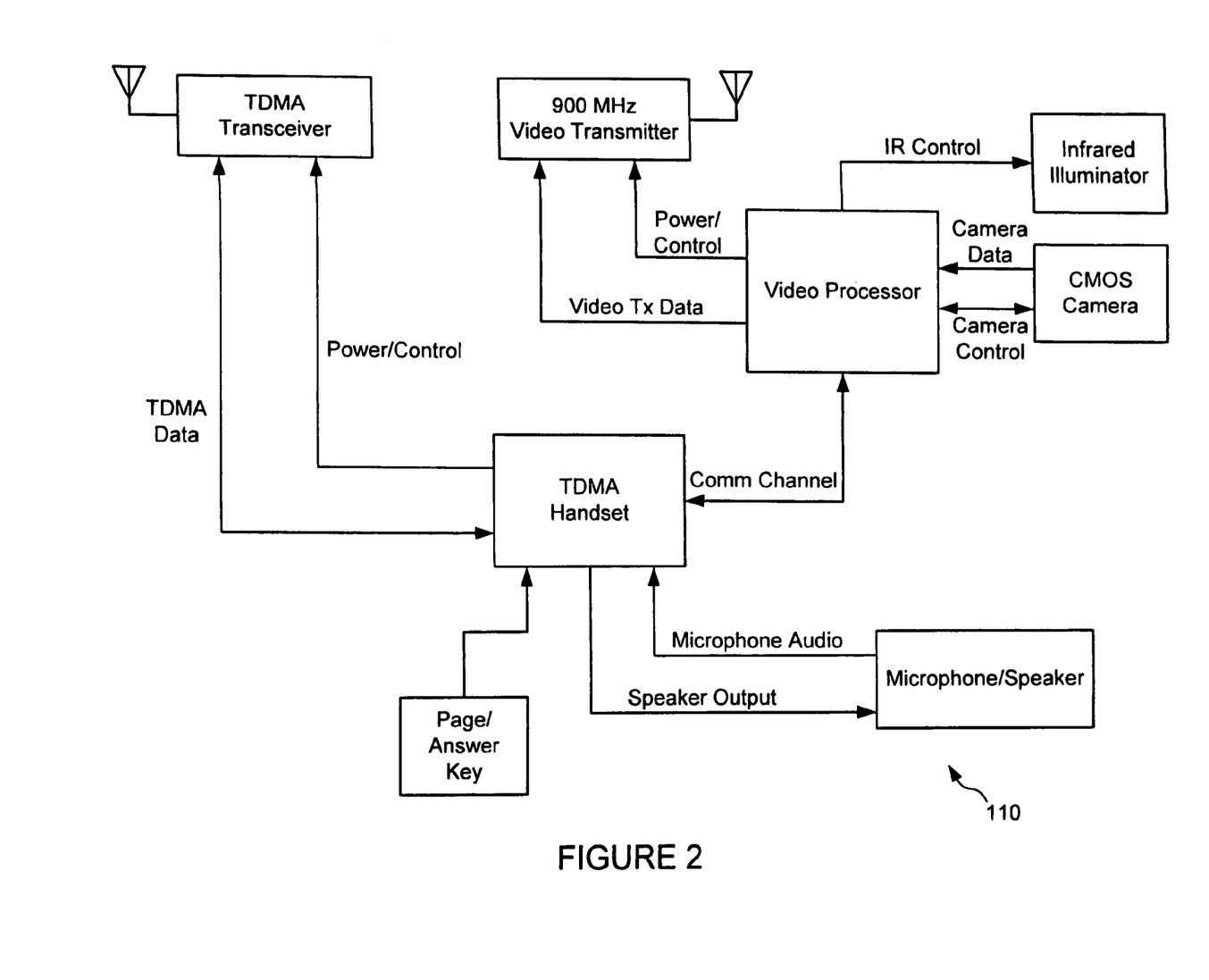
FIG. 2 depicts an exemplary camera and camera doorbell module system diagram in accordance with the present invention.

An infrared illuminator may also be incorporated into the camera speakerphone and camera doorbell modules in order to illuminate the field of view when low or no visible light is present, as shown in FIG. 2.

Exemplary System Operation with Video

A. Doorbell Operation

1. A visitor approaches the door and presses a "Bell" button (not shown) on the camera doorbell unit (CDB) 110. The CDB 110 wakes up upon sensing the press of the button and initiates a voice/data link to the speakerphone base unit (SB) 101. Alternatively, sensed motion is used to trigger subsequent events.

2. The SB 101 signals the handsets 115, 120 that someone has pressed the doorbell button and all voice handsets (H) and video & voice handsets (VH) 115, 120 begin alerting.

3. If a voice only handset (H) 670 or the base (SB) 101 answers the alert, then a two-way voice intercom is made between the CDB 110 and the handset 120 or base 101.

4. If a video handset (VH) 115 answers the alert, then VH 115 sets up a two-way voice intercom link to the CDB 110 using the base unit 101.

4a. The VH 115 then uses the data connection made using TDMA to turn on the video camera on the CDB 110 and begin transmitting the video using the 900 MHz link.

4b. The VH 115 turns on its 900 MHz video receiver and begins displaying the video image.

B. Baby Monitor Operation

1. A baby is sleeping in a room where a camera speakerphone unit (CS) 105 is located.

2. A caregiver wishes to view the baby using the Video Handset 115 and presses a "View" button on the handset.

3. The VH 115 sends a message to the base unit 101 requesting the view command.

4. The base unit 101 creates a silent intercom connection to the CS 105 and tells it to turn on the video camera and begin transmitting the video using the 900 MHz link.

5. The VH 115 turns on its 900 MHz video receiver and begins displaying the video image.

With reference to FIG. 2, a camera unit in accordance with the present invention preferably comprises:

2.4 GHz or 5.8 GHz TDMA RF transceiver
900 MHz digital modulation video transmitter
TDMA handset module
Video Processor
CMOS Camera
Infrared illuminator
Keypad
Microphone and speaker The TDMA RF transceiver receives and transmits digital voice and data using either 2.4 or 5.8 GHz frequency technology. The data received and transmitted by the transceiver is passed to or generated by the TDMA handset module. This module preferably comprises a microprocessor, memory and other analog peripherals necessary to complete a voice telephony call.

The Video portion of the system comprises a digital CMOS imaging camera, a Video Processor, an infrared illuminator and a 900 MHz digital modulation video transmitter.

Images are captured by the CMOS camera module and preferably transferred to the Video processor via a YUV or RGB data interface. Various camera operations such as white balance, exposure, black level, etc. are controlled by the Video processor via a serial interface.

The image data is manipulated by the Video processor into video data packets. These are passed on (Video TX Data) to the 900 MHz digital modulation transmitter. Use of video compression techniques, along with digital processing minimizes the data transmitted. This reduces transmission bandwidth and allows more power to be transmitted resulting in increased range.

Optionally, an infrared illuminator is provided on the camera side to light the area under view with infrared light. This allows the camera to capture images even in the dark. The illuminator preferably comprises an array of IR LEDs that are pulsed on as needed to capture the image.

The Video Processor interfaces to the TDMA handset using the Comm Channel. The Comm Channel is used to communicate with the Video receiver and other peripherals including the TDMA handset.

Figure 3:
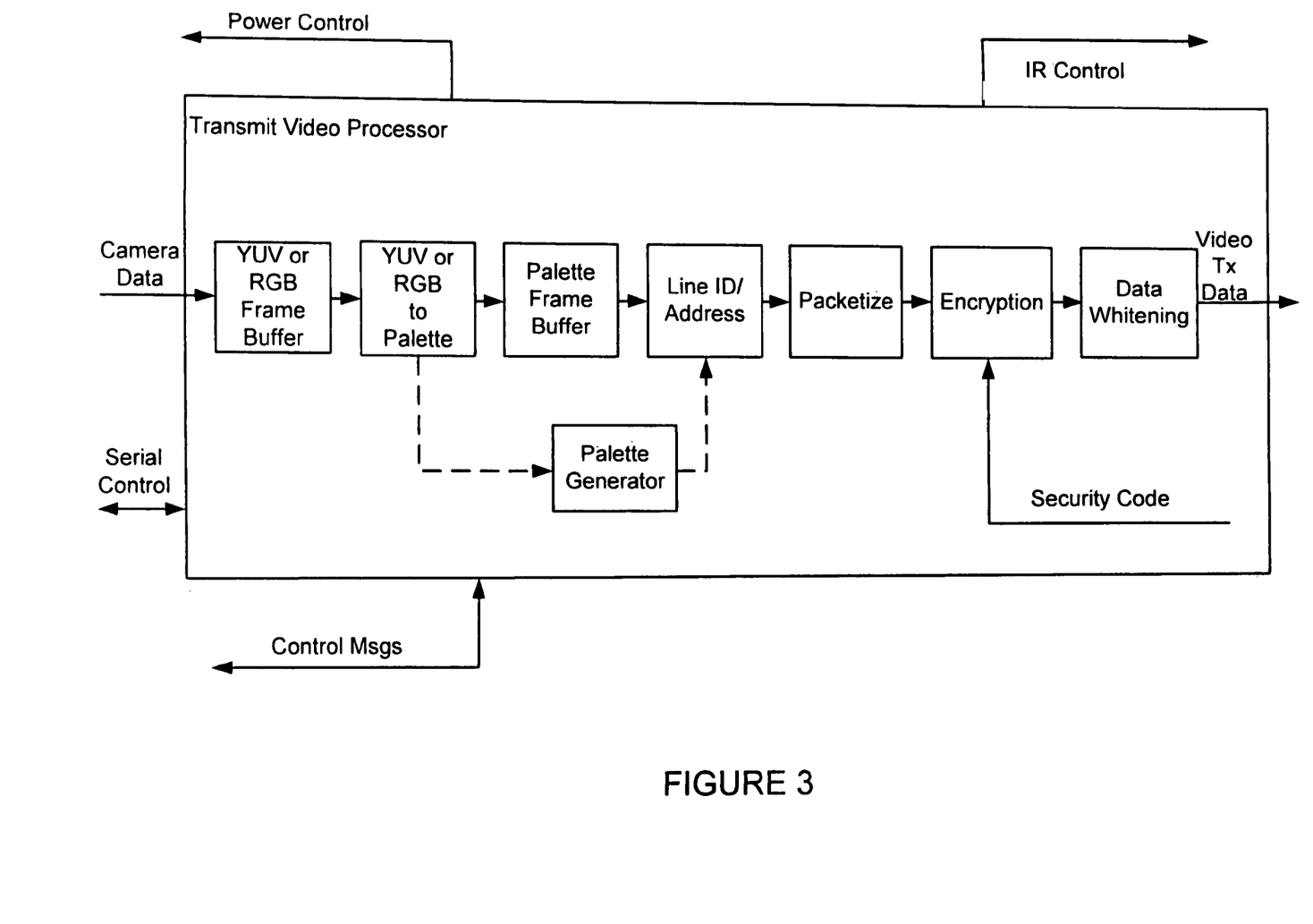
FIG. 3 depicts a block diagram of exemplary camera video processing in accordance with the present invention.

With reference to FIG. 3, image data is transferred from the CMOS (or other image technology) camera in 4:2:2 YUV or RGB format to the YUV or RGB frame buffer in the Video Processor. Each pixel is converted from YUV format 16-bit (65,000 colors) or RGB format 24-but (16M colors) into an 8, 10 or 12 bit value, which means each pixel is converted into one of 256, 1024, or 4096 distinct colors respectively. This process is called palettization and helps to compress the transmitted data. There can be either 256, 1024 or 4096 colors in a palette, based on the number of bits allocated to each pixel.

The palette can be fixed (such as that used in Windows applications) or dynamically generated. Fixed palettes have some limitations in that some fine color details may not be accurately represented due to the limited colors in the palette. Dynamic palettes can render the image much better because custom colors present in the image can be added to the palette. If a dynamic palette is required it can be optionally generated in the Video processor.

The palettized image is saved in another frame buffer prior to transmitting. Each line in the image is read from the palette frame buffer and a line identification number and address is incorporated. The line data is then packetized along with framing information and a cyclic redundancy check (error detection code). This information is preferably scrambled with a security code and randomized with a whitening code in order to make the data appear random. The completed packet is passed on to the transmitter.

Figure 4:
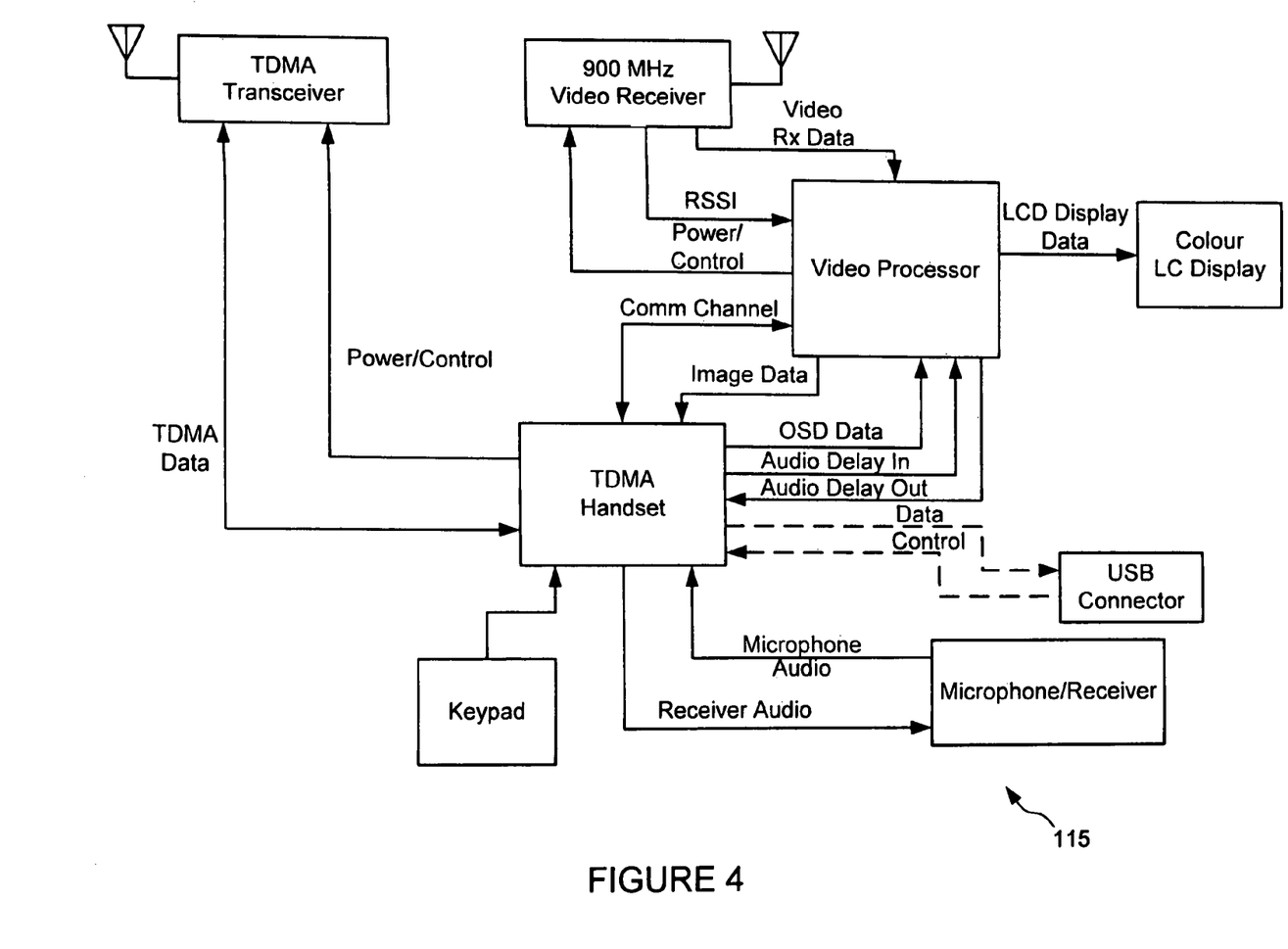
FIG. 4 depicts a block diagram of an exemplary video handset system in accordance with the present invention.

With reference to FIG. 4, The Video Handset unit preferably comprises:

2.4 GHz or 5.8 GHz TDMA RF transceiver
900 MHz digital modulation video receiver
TDMA handset module
Video Processor
Keypad
Microphone and speaker (receiver)

The TDMA RF transceiver receives and transmits digital voice and data using either 2.4 or 5.8 GHz frequency technology. The data received and transmitted by the transceiver is passed to or generated by the TDMA handset module. This module preferably comprises a microprocessor, memory and other analog peripherals necessary to complete a voice telephony call.

The Video portion of the handset system consists of a Video Processor, a 900 MHz digital modulation video receiver and a 120×160 Color LCD display.

The TDMA handset interfaces to the handset Receive Video Processor using the Comm Channel. Control information sent by the Camera module using the TDMA voice/data channel is passed to the Receive Video Processor. The Receive Video Processor can then activate the 900 MHz Digital Modulation video receiver using the Power Control interface. The TDMA handset can also pass graphical and textual information to be included with the video information using an OSD (On Screen Display) Data interface. An Audio Delay In/Out interface is preferably provided to allow TDMA audio to be delayed by the Video Processor in order to maintain audio-video synchronization and to be passed back to the TDMA handset for playback.

Video data from the 900 MHz receiver along with Receive Signal Strength Indication (RSSI) is processed into images that are displayed on the Colour LC Display.

Figure 5:
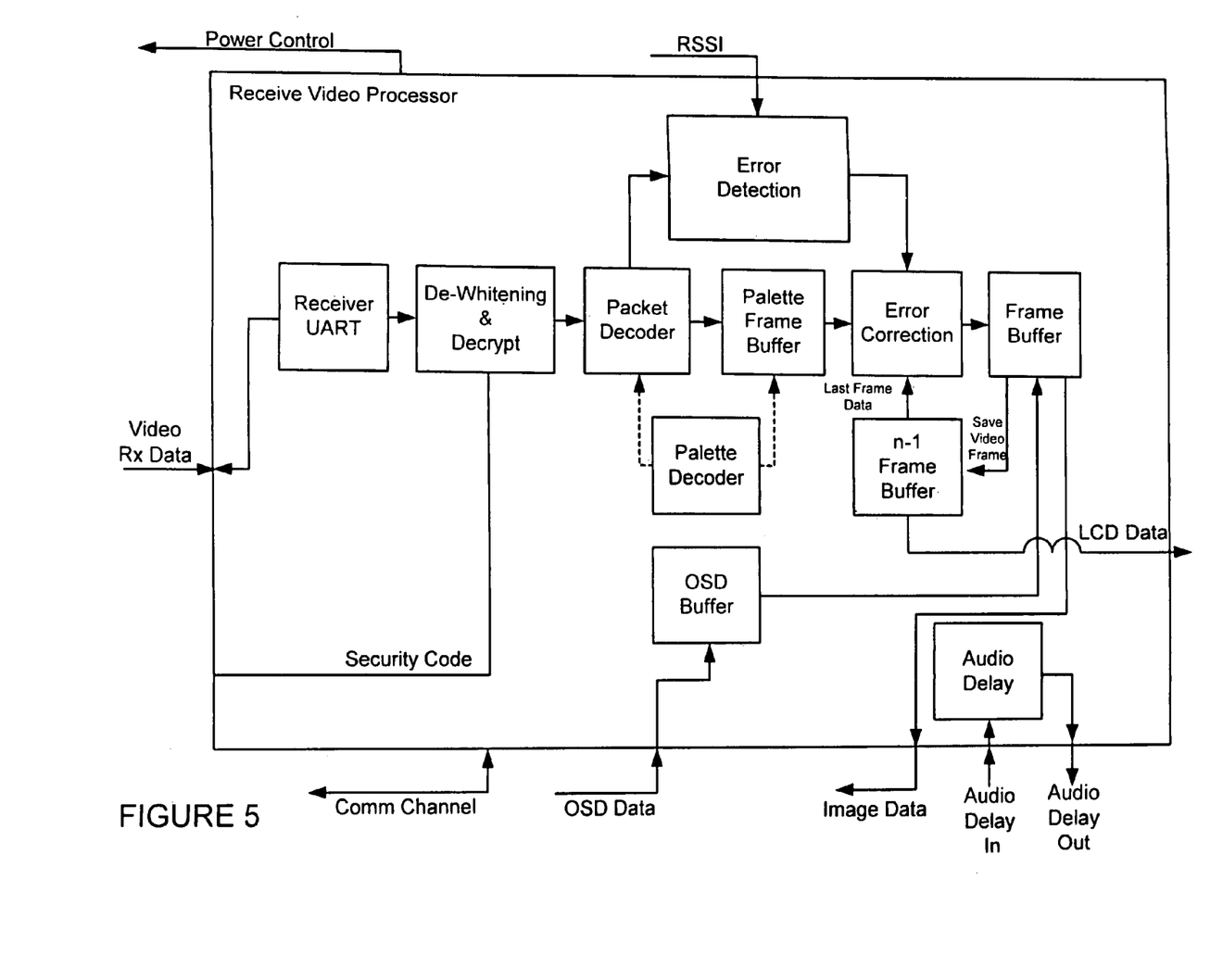
FIG. 5 depicts a block diagram of exemplary handset video processing in accordance with the present invention.

With reference to FIG. 5, The Handset Receive Video Processor accepts the demodulated data from the 900 MHz radio and the data is decoded. The decoded data is de-randomized and de-scrambled and passed into the Packet Decoder to remove the true video data. Each received packet contains the data from one line of video information or it may contain palette information. If the packet contains palette information, this information is passed to the dynamic palette decoder.

The packet decoder also passes information on to the Error Detection module which checks the CRC and the receive signal strength to determine if the received data may have been corrupted. If the Error Detector determines the data is in error, it requests the Error Corrector module to try and fix it.

The palettized information is converted to a colour space format acceptable to the LC Display.

The saved frame of video information in the Pallete Frame buffer is transferred to the Frame Buffer one line at a time. Those lines identified as having errors can be corrected in one of 3 ways:
  a) substituting the defective line with the same number line from the previously stored video frame,
  b) substituting the defective line with data from the line previous to the defective line, or,
  c) substituting the defective line with a new line interpolated from the data on the previous and successive line.

If the TDMA handset has any textual or graphic information to be displayed along with the received video image, it is saved in the OSD Buffer and merged with the corrected video image in the Frame Buffer.

Once the video frame has been rendered along with any graphical or text data, it is transferred to the Last Frame Buffer. The LC Controller interface transfers the data from the Last Frame Buffer to the LC Display. The Last Frame Buffer data is also used in the error correction process.

The Video Processor also preferably includes an Audio Delay module which delays digital audio packets sent by the TDMA Handset in order to provide audio-video synchronization. The delayed audio packets are sent back to the TDMA handset so they can be played back on the handset audio receiver.

Embodiments of doorbell intercom systems that may operates in a voice mode are described below, with reference to FIGS. 6-8. Note that although a doorbell module 70 of FIG. 6 only shows audio processing features, it can be modified to include a camera module 75 for transmitting video signals. Camera module 75 may be substantially identical with camera doorbell unit (CDB) 110 illustrated in FIGS. 1 and 2 and correspondingly, the detailed description of camera module 75 will not be repeated hereinafter.

Figure 6:
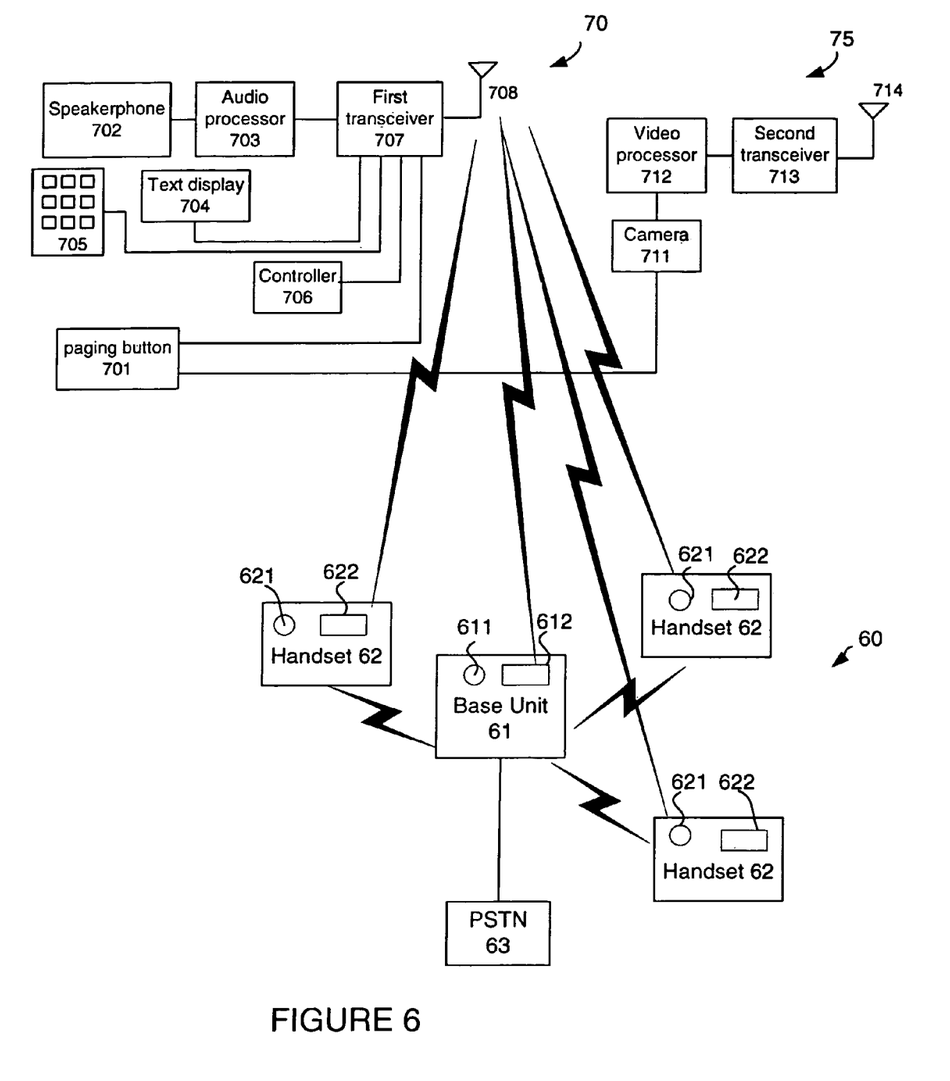
FIG. 6 depicts an exemplary system diagram for a multi handset cordless telephone system with a door bell module in accordance with the present invention.

As shown in FIG. 6, multi handset cordless telephone system 60 includes a base unit 61 and a number of cordless handsets 62 that have radio communication with base unit 61. Each of base unit 61 and cordless handsets 62 includes a speakerphone 611, 621 and a display 612, 622, respectively. Base unit 61 connects to a PSTN 63. Base unit 61 preferably supports voice intercom calls, caller ID, and other typical features. Preferably, base unit 61 also includes an answering machine. In addition, base unit 61 preferably includes a cradle that provides handset charging. Moreover, base unit 61 is configured to provide data communications with handsets 62 and doorbell module 70. Preferably, any of handsets 62 may page and/or intercom any other handsets 62 and base unit 61.

Doorbell module 70 is a functional portable unit that is typically located at a door and is wirelessly communicable with base unit 61 and handsets 62. Preferably, doorbell module 70 has similar electronics as a cordless handset that includes audio and RF link with base unit 61. Doorbell module 70 is located at a distance within a receivable range of wireless communications system of base unit 61 and handsets 62. Doorbell module 70 preferably includes a paging button 701 that, when activated, enables doorbell module 70 to transmit a RF message to base unit 61 and/or handsets 62 through a first transceiver 707 and an first antenna 708. The intercom function takes place when a user answers from any of handsets 62 or base unit 61. No wired connection is required for connecting doorbell module 70 to multi handset cordless telephone system 60. Doorbell module 70 also includes a speakerphone 702 and an audio processor 703 for providing intercom audio conversations. Preferably, audio processor 703 supports the speakerphone functionality. Furthermore, speakerphone 702 and audio processor 703 may be embodied in a handset that is located in associated with doorbell module 70. Doorbell module 70 may be battery powered with option to have the battery charging from either an AC adapter or from an existing doorbell ring.

By the use of doorbell module 70, no separate intercom system such as a conventional intercom system is required. Doorbell module 70 may also work in parallel with an existing doorbell ringer. In this case, when page button 701 is pressed, doorbell module 70 pages telephone system 60 and shorts a bell wire to make the existing bell ring.

Instead of paging all handsets 62 and base unit 61, doorbell module 70 may optionally page one specific handset or just base unit 61. This can be done by adding a text display 704 and/or additional buttons or keys 705 to doorbell module 70. Furthermore, a controller or control circuit 706 may be added to doorbell module 70 to control an electronic door lock (not shown) remotely from any of handsets 62 or base unit 61.

As illustrated in FIG. 6, doorbell module 70 may be incorporated with camera module 75 to transmit images to multiple handset cordless telephone system 60 in addition to transmitting the audio signals described above. Please note that camera module 75 may include all elements of the camera unit (i.e., CDB 110) of FIG. 2. For the sake of simplicity on the drawings, camera module 75 of FIG. 6 only shows a camera 711, a video processor 712, a second transceiver 713, and a second antenna 714.

In operation, when a visitor presses paging button 701, it not only initiates first transceiver 707 to transmit a RF message to multiple handset cordless telephone system 60, it also initiates camera 711 to take images of the visitor. The images taken are transmitted to video processor 712 for processing and then transmits through second transceiver 713 and second antenna 714 to multiple handset cordless telephone system 60 via a data link after the two-way communication is established. The images are then displayed on display 612 or 622 of base unit 61 or handset 62.

Figure 7:
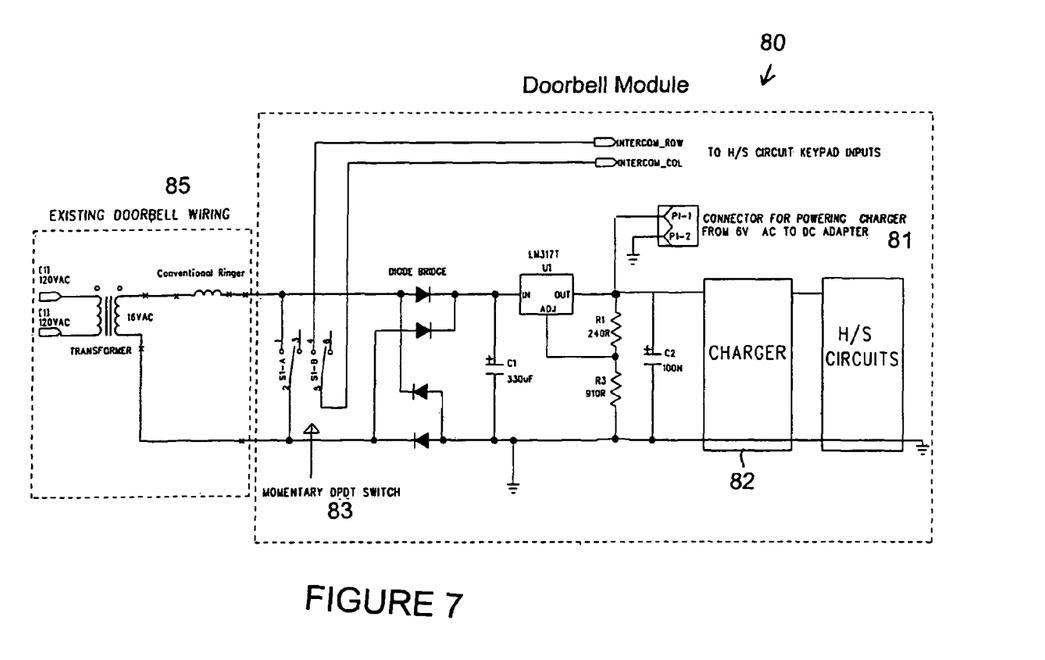
FIG. 7 depicts a circuitry illustrating a connection of existing doorbell wiring and a wireless doorbell module in accordance with the present invention.

FIG. 7 illustrates an exemplary charging circuitry 80 of doorbell module 70 in connection with an existing doorbell wiring 85. A typical charging circuit usually requires DC voltage (6V) to charge a battery. There are two options to connect the DC voltage to doorbell module 70. The first option is to connect a 6V AC to DC adapter 81 to an AC outlet and route an DC output wire to where doorbell module 70 is mounted. The second option is to use existing doorbell wiring 85 to provide voltage to charger 82 of doorbell module 70 if there is a doorbell already installed. As the standard voltage available at the door bell is 16 VAC, this AC voltage can be rectified before being used for charger 82. It is also common to draw some current through the doorbell coil, as is done to power a small bulb to light the door bell button. Furthermore, the doorbell/intercom button includes a DPDT switch 83, that shorts the doorbell wires and in addition, shorts the row and column for intercom function. The charging momentarily stops as the inputs to the charge (the bell wires) is shorted. The coil type doorbell draws about 1 amp of current to ring the bell.

Figure 8:
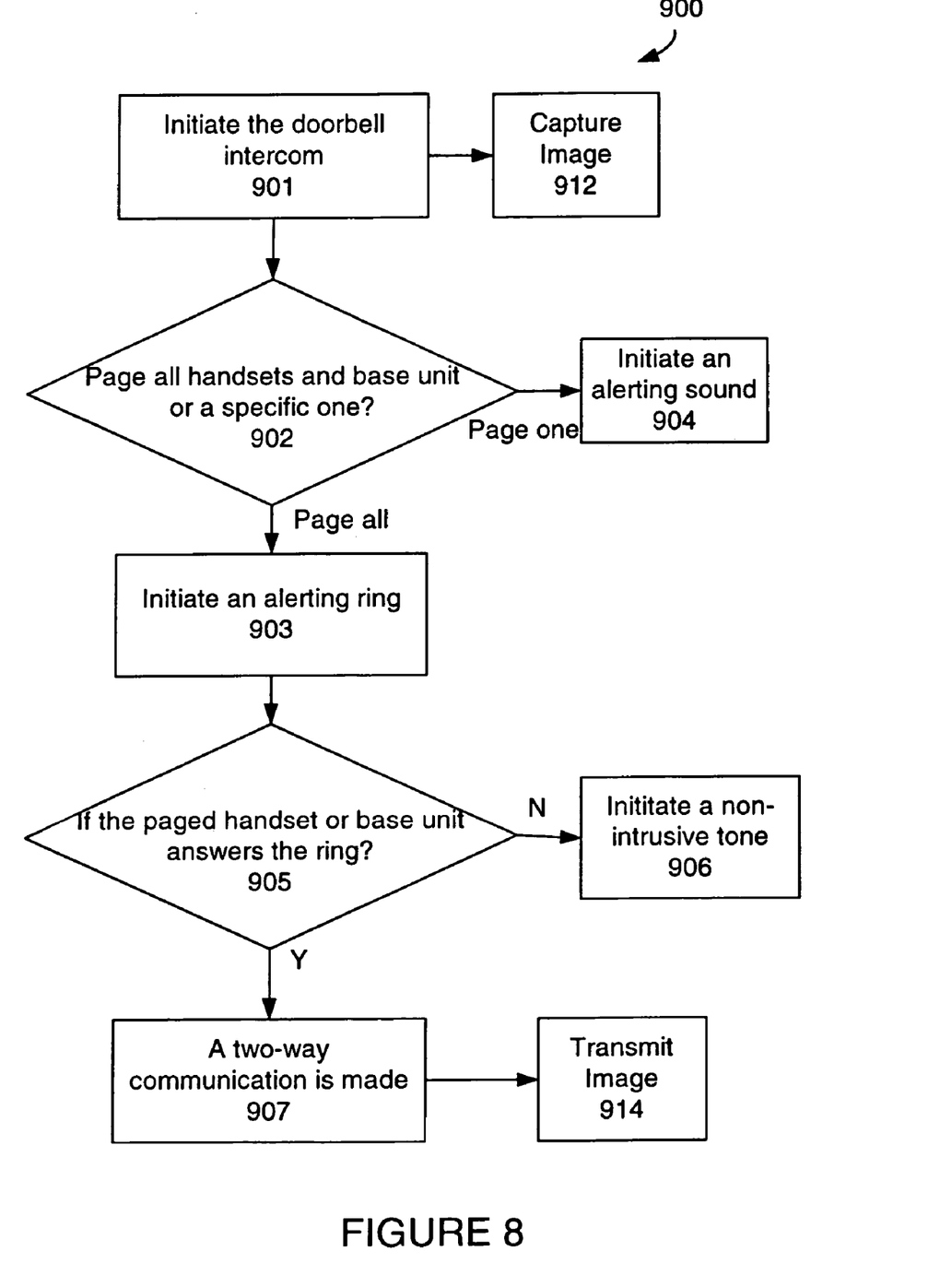
FIG. 8 depicts a process for carrying out a two-way voice communication between a doorbell intercom and a multiple handset telephone system.

A process 900 for carrying out a doorbell intercom is illustrated in FIG. 8. As shown at step 901, when a visitor approaches the door of a residence, he/she can ring the bell for pressing paging button 901 that is associated with doorbell module 70. The initiation of paging button 701 activates doorbell module 70 to transmit a RF message to base unit 61 and/or one or more handsets 62. In an embodiment of the invention that includes camera module 75, the initiation of paging button 701 also activates camera 711 to capture an image of the visitor at step 912.

At step 902, a decision about whether the visitor pages base unit 61 and all the handsets 62 is made. As described above, the visitor can select a specific handset or only base unit 61 to be paged by pressing additional keys or buttons 705 of doorbell module 70 instead of paging all of handsets 62 and base unit 61. In an alternative embodiment, the selection may be done at base unit 61. For example, when the user of multiple handset cordless telephone system 60 is working at the back yard, he/she can set up the intercom paging to one specific handset that he/she is carrying to the back yard. In this case, paging selection keys or buttons 705 of doorbell module 70 may be disabled and all the selection will be directed by base unit 61 to that setup specific handset.

At steps 903 and 904, whether the visitor chooses to page all of handsets 62 and base unit 61 or one particular handset, the RF message initiates a voice link to a speakerphone of the handset(s) or base unit 61 to be paged so that an alert sound can be heard by a resident.

At steps 905, in accordance with the present invention, if the handset(s) or base unit 61 that are paged are in use, i.e., already engaged in a communication session, a non-intrusive alerting tone can be heard over the telephone conversation, as shown in step 906. In some embodiments, the non-intrusive alerting tone is heard as a call-waiting signal.

At step 907, when the paged handset(s) or base unit answers the alert, a two-way intercom communication is then made between doorbell module 70 and handset 62 or base unit 61. At the time, the visitor can speak with the residence through an audio link. Moreover, at step 914, second transceiver 713 transmits the image captured at step 912 to the display of one or more of base unit 61 and handsets 62 via a data link. In a preferred embodiment, if base unit 61 is chosen for paging, after receiving the RF message, base unit 61 may also signals handsets 62 that someone has pressed the doorbell button and all handsets 62 begin alerting. This function can be done at the base unit automatically or manually.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A cordless telephone system, comprising:
   a base unit;
   at least one cordless telephone handset that wirelessly communicates with the base unit, wherein the base unit and the at least one cordless telephone handset include speakerphones and displays; and
   a doorbell module that comprises a video camera and is located within a range of receivable wireless communications of the base unit and the at least one cordless telephone handset, the doorbell module comprising a page button, wherein when the page button is pressed, the doorbell module transmits an RF message to activate an alert sound from the speakerphones, and the video camera is initiated to take images, which are transmitted to a video processor, compressed and transmitted to at least one of the base unit and the one or more cordless telephone handsets,
   wherein the images are palettized and saved in a frame buffer prior to transmission, and
   wherein each line in each palettized image is read from the frame buffer, and a line identification number and address is incorporated into the line, thus forming line data representing the image.

2. The system of claim 1, wherein the handset comprises a receive video processor that receives encoded data representing the images and decodes the encoded data to extract the video image.

3. The system of claim 1, wherein the doorbell module further comprises:
   a number of keys providing choices for a user to select one or more of the base unit and the at least one cordless telephone handset to be paged.

4. The system of claim 1, wherein the doorbell module further comprises:
   a text display providing choices for a user to select one or more of the base unit and the at least one cordless telephone handset to be paged.

5. The system of claim 1, wherein the doorbell module further comprises infrared illumination capabilities.

6. The system of claim 1, wherein the doorbell module is coupled with a charger for providing power to the doorbell module, and wherein the charger is configured to receive power from an existing doorbell wiring that is connected in parallel with the doorbell module.

7. The system of claim 1, wherein audio information associated with the RF message is transmitted on a first frequency and video information associated with the images is transmitted on a second frequency.

8. The system of claim 7, wherein the first frequency is one of 2.4 and 5.8 GHz and the second frequency is 900 MHz.

9. A cordless telephone system, comprising:
- a first transceiver on a doorbell module for transmitting and receiving RF messages with a base unit of the cordless telephone system;
- a paging button on the doorbell module, when pressed, initiating the first transceiver to transmit the RF messages to the base unit; and
- a camera unit, coupled to the doorbell module, for capturing an image when the paging button is pressed, and for transmitting the image to the base unit using a second transceiver on the camera unit wherein the image is compressed prior to transmission to the base unit,
- wherein the image is palettized and saved in a frame buffer prior to transmission,
- wherein each line in the palettized image is read from the frame buffer, and wherein a line identification number and address is incorporated into the line, thus forming line data representing the image.

10. The cordless telephone system of claim 9, wherein the wireless telephone system comprises at least one wireless handset, wherein the at least one wireless handset comprises a speakerphone and a display, and wherein the doorbell module further comprises infrared illumination capabilities.

11. The cordless telephone system of claim 10, further comprising
- a number of keys coupled to the doorbell module, for providing choices for a user to select one or more of the base unit and the at least one cordless telephone handset to be paged.

12. The cordless telephone system of claim 10, further comprising:
- a text display providing choices for a user to select one or more of the base unit and the at least one cordless telephone handset to be paged.

13. The cordless telephone system of claim 9, wherein audio information associated with the RF message is transmitted on a first frequency and video information associated with the image is transmitted on a second frequency.

14. A method of communication between a doorbell intercom system and a wireless telephone system, the doorbell intercom system comprising a video camera, the wireless telephone system comprising a base unit and at least one wireless handset, each of the base unit and the at least one wireless handset comprising speakerphones and displays, the method comprising:
- initiating a paging selection to establish a voice link between the doorbell intercom system and the wireless telephone system;
- alerting one or more of the base unit and the at least one wireless handset through the speakerphone by transmitting an RF message from the doorbell intercom system to the wireless telephone system;
- capturing an image;
- compressing the image;
- transmitting the compressed image to at least one of the base unit and the one or more cordless telephone handsets;
- palettizing the image prior to transmission;
- saving the palettized image in a frame buffer prior to transmission,
- reading each line in the palettized image from the frame buffer, and
- incorporating a line identification number and address into each line, thus forming line data representing the image.

15. The method of claim 14, wherein when the wireless telephone system is already in use for a telephone conversation, transmitting a different alerting tone to be heard over the telephone conversation.

16. The method of claim 14, wherein the line data representing the image is packetized and scrambled with a security code prior to transmission.

* * * * *

UNITED STATES PATENT AND TRADEMARK OFFICE
CERTIFICATE OF CORRECTION

PATENT NO.        : 7,738,917 B2                                    Page 1 of 1
APPLICATION NO. : 11/430048
DATED             : June 15, 2010
INVENTOR(S)       : Gordon Ryley et al.

It is certified that error appears in the above-identified patent and that said Letters Patent is hereby corrected as shown below:

In the claims:
Column 11, line 17, Claim 9 after "unit", insert --,-- and a carriage return.

Signed and Sealed this

Thirtieth Day of November, 2010

David J. Kappos
*Director of the United States Patent and Trademark Office*